United States Patent [19]

Beutnagel

[11] Patent Number: 6,078,885
[45] Date of Patent: Jun. 20, 2000

[54] VERBAL, FULLY AUTOMATIC DICTIONARY UPDATES BY END-USERS OF SPEECH SYNTHESIS AND RECOGNITION SYSTEMS

[75] Inventor: Mark C. Beutnagel, Mendham, N.J.

[73] Assignee: AT&T Corp, New York, N.Y.

[21] Appl. No.: 09/075,162

[22] Filed: May 8, 1998

[51] Int. Cl.[7] .................................................. G10L 13/08
[52] U.S. Cl. ........................ 704/258; 704/260; 704/231
[58] Field of Search .................................. 704/258, 260, 704/209, 231

[56] References Cited

U.S. PATENT DOCUMENTS

| | | | |
|---|---|---|---|
| 5,384,893 | 1/1995 | Hutchins | 704/258 |
| 5,592,585 | 1/1997 | Van Coile et al. | 704/258 |
| 5,682,501 | 10/1997 | Sharman | 704/258 |
| 5,727,120 | 3/1998 | Van Coile et al. | 704/258 |
| 5,774,854 | 6/1998 | Sharman | 704/260 |
| 5,933,804 | 8/1999 | Huang et al. | 704/244 |

*Primary Examiner*—David R. Hudspeth
*Assistant Examiner*—Susan Wieland

[57] ABSTRACT

A method and system that allows users, or maintainers, of a speech-based application to revise the phonetic transcription of words in a phonetic dictionary, or to add transcriptions for words not yet present in the dictionary. The application is assumed to communicate with the user or maintainer audibly by means of speech recognition and/or speech synthesis systems, both of which rely on a dictionary of phonetic transcriptions to accurately recognize speech and pronunciation of a given word. The method automatically determines the phonetic transcription based on the word's spelling and the recorded preferred pronunciation, and updates the dictionary accordingly. Moreover, both speech synthesis and recognition performance are improved through use of the updated dictionary.

24 Claims, 2 Drawing Sheets

VERBAL, FULLY AUTOMATIC DICTIONARY UPDATES BY END-USERS OF SPEECH SYNTHESIS AND RECOGNITION SYSTEMS

TECHNICAL FIELD

The present invention relates generally to the field of speech synthesis and recognition systems, and, more particularly, to updates to the dictionaries used by those systems.

BACKGROUND

Speech synthesis and recognition systems are well-known. Although the dictionaries used in such systems are generally quite good for standard English and even for proper names, the dictionaries can never provide perfect performance, and user-provided exceptions must be allowed. For example, some customers use text-to-speech (TTS) systems for applications with specialized vocabularies, such as individual's names, pharmaceuticals, street names, company names, etc. This often requires that the dictionaries be customized by the end-users to include these specialized vocabularies. In addition, the fact that a single name may be pronounced differently in various geographic locales insures that customization is often necessary. For instance, the most obvious pronunciation of "Peabody" is not at all correct near Boston, Mass.; in Boston, the middle syllable of "Peabody" is deaccented, i.e., it becomes a very short "buh" sound. Currently, such corrections are made by typing the desired pronunciation into, e.g., an "exception" dictionary. The person making the entry must know the proper phonetic transcription of the word in terms of the particular phonetic alphabet used by the TTS system. End-users are typically not willing to devote the time and energy needed to become proficient in constructing alternative pronunciations.

This situation would be improved only marginally by allowing end-users to enter pronunciations in a standardized phonetic alphabet such as the International Phonetic Alphabet (IPA). Although it is a "standard", it is not necessarily any easier for end-users to learn, and usage by American linguists differs substantially from the official standard, leading to further confusion.

Other approaches have been suggested, generally involving much trial and error. For example, the end-user could use "creative spelling" to find an alternate way of typing the name so that the TTS happens to produce the desired result. The system could then enter the internally-generated phonetics into the exception dictionary. This often works, but takes time and may not always produce satisfactory results. Another approach is to automatically generate the "N-best" (i.e., most likely) pronunciations for a given word, let the end-user listen to all N attempts (as spoken by the TTS system), and identify which was closest. This also may involve quite a bit of time on the end-user's part, and the number of examples (N) may need to be very large to reach unusual or unexpected pronunciations.

Alternatively, the TTS system could simply record the corrected word as spoken by the end-user, but this falls short in several respects. First, the application must store the recordings of each corrected word forever, and such recordings require much more storage than printable transcriptions. Second, it must interrupt the synthetic voice to find and play the recorded word. Third, the recorded voice will not match the synthetic voice. In general, they will be different speakers, perhaps even different genders. Even if the speaker is unchanged, the recorded word is fixed and cannot easily change speaking rate, pitch, or other voice characteristics to match the current context. Lastly, only playback benefits from the recorded word: speech recognition accuracy is not improved.

As such, there is a need for an efficient method for end-users of speech synthesis and recognition systems to customize the pronunciations of words in the dictionaries used by those systems.

SUMMARY OF INVENTION

A technical advance is achieved in the art by providing a method and system that allows users, or maintainers, of a speech-based application to revise the phonetic transcription of words in a phonetic dictionary (or add transcriptions for words not present in the dictionary), simply by speaking a preferred pronunciation. The method and system automatically determines the phonetic transcription that corresponds to the spoken word, and places the phonetic transcription into the dictionary. This preferred pronunciation may then be used by default. Moreover, both speech synthesis and recognition performance are improved through use of the updated dictionary.

DETAILED DESCRIPTION

Figure 1:
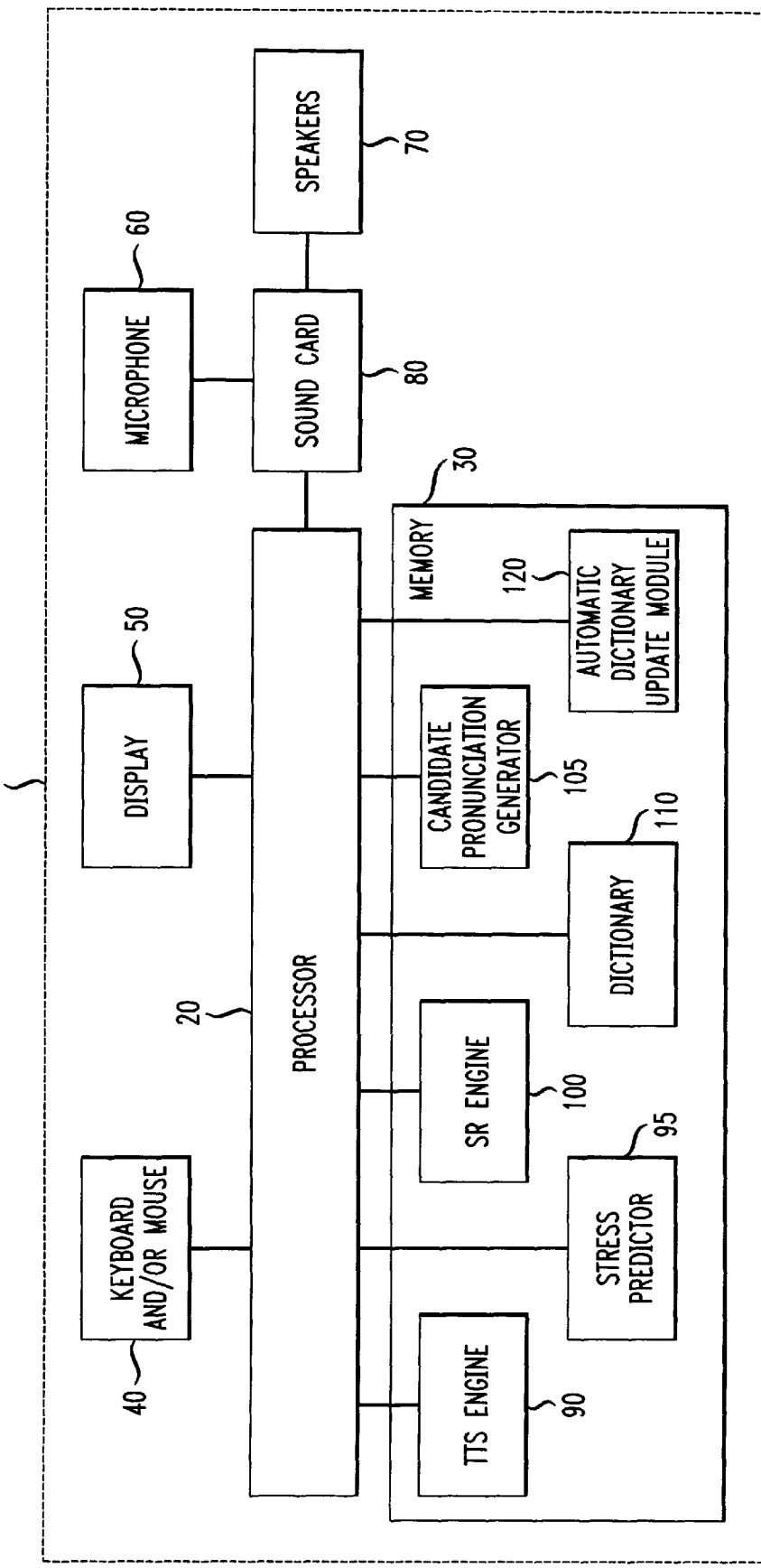
FIG. 1 is a block diagram of one embodiment of the present invention.

Referring to the drawings, FIG. 1 illustrates a computer system 10, comprising central processing unit 20 (e.g., an Intel Pentium™ processor) coupled to memory 30 (e.g., RAM), input device 40 (e.g., a keyboard and/or a mouse) and display 50.

CPU 20 is also coupled to microphone 60 and speakers 70 via sound card 80. Sound card 80 may be a Sound Blaster™ compatible sound card. Computer system 10 implements text-to-speech conversion and speech recognition by stored-program execution. As such, memory 80 includes a TTS engine 90 and a speech recognition engine 100, both of which have access to dictionary 110. TTS engine 90 and speech recognition engine 100 may be the "Watson" TTS system and speech recognizer, manufactured by AT&T Corp. Dictionary 110 contains a plurality of words and one or more "pronunciations" for each word, including a default pronunciation. TTS engine 90 uses dictionary 110 to convert words from a computer document (e.g., a word processing document) into audible speech, which is then played to the end-user through the computer's speakers 70. Speech recognition engine 100 also uses dictionary 110 to convert words spoken by the end-user into text.

In accordance with the present invention, memory 30 also includes an automatic dictionary update module 120. As will be discussed in more detail with reference to FIG. 2, module 120 permits an end-user of TTS engine 90 (or speech recognition engine 100) to revise the phonetic transcription of words in dictionary 110 (or add transcriptions for words not present in dictionary 110), simply by speaking a preferred pronunciation into microphone 50. Memory 30 also includes candidate pronunciation generator 105 and stress predictor 95. Generator 105 is used by module 120 to generate candidate pronunciations for use by speech recognition engine 100, as will be described in detail hereinafter. Stress predictor 95 is used by module 120 to assign syllable stress to phonetic transcription(s) generated by speech recognition engine 100, as will also be described in detail hereinafter.

The process performed by module 120 in providing verbal, fully automatic dictionary updates is discussed in detail in connection with FIG. 2 using the word "Peabody" as an example of a word whose entry in dictionary 110 is to be updated. The process is described using two notations for the pronunciation of words: one for phonemes (i.e., the characters of a phonetic alphabet) and one for stress, or the emphasis with which the syllables of a phonetic transcription are spoken. For purposes of illustration, the present invention assumes that stress affects only "syllabic" phonemes, which are mostly vowels. In actuality, however, these also include "liquids" L and R, "nasals" M and N, but only when they occur in syllabic form, e.g., med(al), feath(er), mutt(on), and ryth(m).

With regard to the phonetic alphabet, the following character set will be used to indicate phonemes:

| | |
|---|---|
| A | as in (a)ble |
| & | as in (a)bout (called schwa) |
| b | as in (b)all |
| d | as in (d)eep |
| E | as in b(ee)p |

| | |
|---|---|
| I | as in k(i)te |
| o | as in b(o)dy |
| O | as in (o)dor |
| p | as in (p)ut |
| w | as in (w)hy |

In addition, two symbols can be used to mark the boundaries between phonemes:

| | |
|---|---|
| # | word boundary |
| - | syllable boundary |

With regard to stress markers, the strongest vowel in a syllabic phoneme is said to have "primary" stress. Other vowels may have "secondary" stress; less than primary stress but still emphasized somewhat. The remaining "unstressed" vowels have no special emphasis. The following markers will be used to indicate stress:

| | |
|---|---|
| " | for primary stress |
| . | for secondary stress |
| <N/A> | no marker for no stress |

A stress marker, if present, will immediately precede the vowel it modifies. Accordingly, the common and preferred pronunciations of the word "Peabody" are then:

| | |
|---|---|
| p"E-b.o-dE | the common pronunciation |
| p"E-b&-d.E | the Massachusetts variant |

It is to be understood that the choice of notations for the phonemes and stress markers is not critical. For example, any phonetic alphabet can be used, such as the International Phonetic Alphabet (IPA), World-Bet, DARPA-BET and the like. Likewise, any notation of stress can be used.

Figure 2:
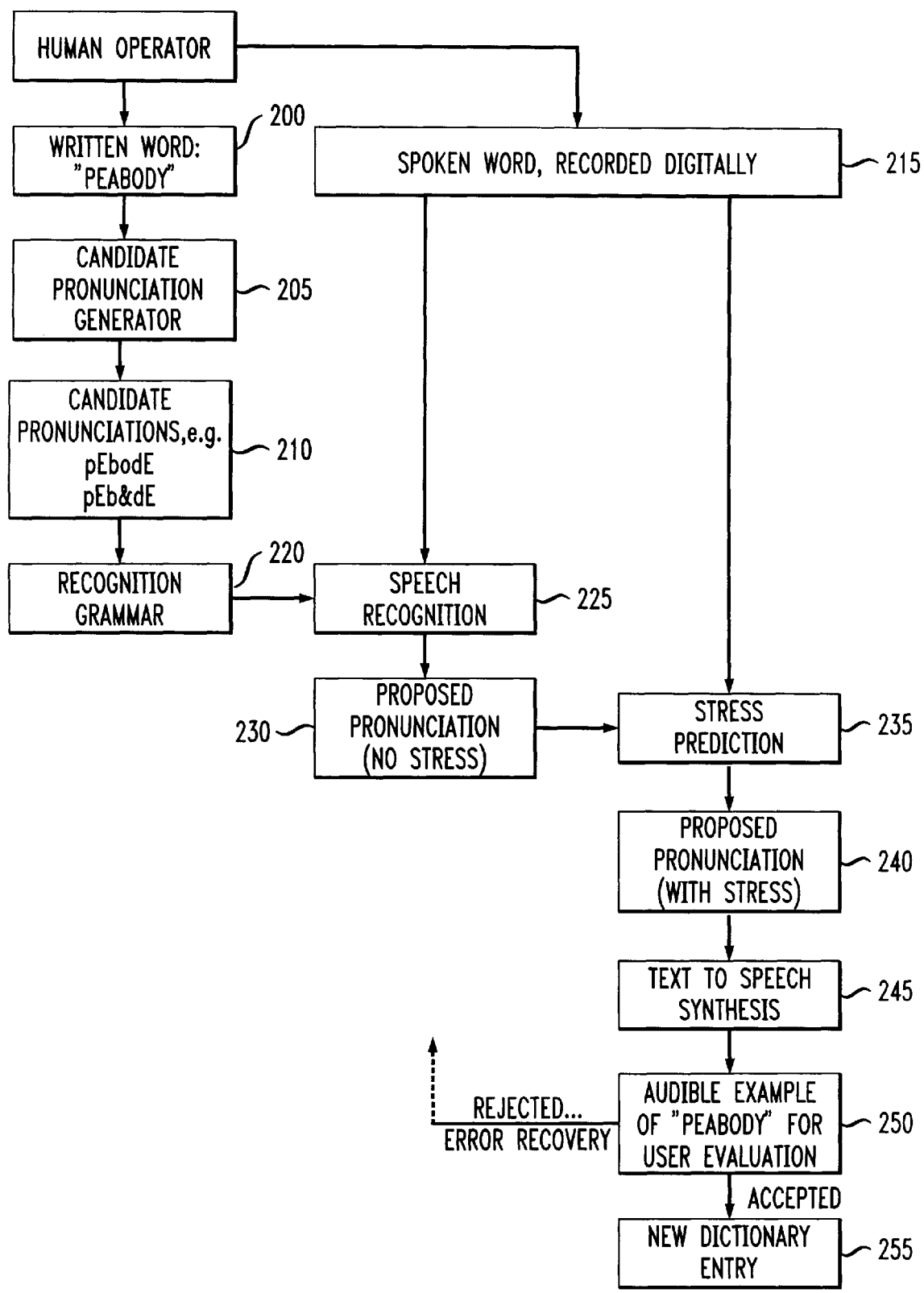
FIG. 2 is a flowchart illustrating an exemplary process by which verbal, fully automatic dictionary updates are provided in accordance with present invention.

Turning to FIG. 2, which illustrates the process performed by module 120 in providing verbal, fully automatic dictionary updates, in step 200, the end-user identifies the word "Peabody" as one which the TTS engine 90 has mispronounced (or one which, for some other reason, the end-user suspects should be updated). For example, the end-user may select an on-screen "update" option and, identify the mispronounced word by using mouse 40 to highlight the word on display 50. Alternatively, the end-user may identify a word to be added to dictionary 110 for the first time by typing the word using keyboard 40. In step 205, candidate pronunciations for the identified word are generated by Candidate Pronunciation Generator 105. The generator 105 can use a variety of techniques to generate plausible pronunciations from the written word (otherwise known as the "orthography").

As such, generator 105 may include its own dictionary of phonetic transcriptions (in addition to dictionary 110), taking into account all possibilities, e.g., all parts of speech and verb tenses (such as for the words "read" (rEEd vs. red) and "record" (re-CORD vs. REC-ord)). This is essentially the same as looking up the word in a published dictionary like Websters™ or American Heritage™ for its various pronunciations. Several such phonetic dictionaries are commercially available in computer-usable form. See, e.g., the CMU Lexicon from Carnegie Mellon University or the COMLEX from the Linguistic Data Consortium at the University of Pennsylvania. Generator 105 may also employ a user-exception dictionary when generating candidate pronunciations; these dictionaries consist of an alphabetized list of words and pronunciations, which are entered manually by an end-user. In addition, generator 105 may use well-known letter-to-sound rules to generate candidate pronunciations. Although letter-to-sound rules are typically used to generate a single pronunciation, it is also possible to apply combinations of these rules to generate a variety of candidate pronunciations, as is well known in the art. One such rule set is described in *Automatic Translation of English Text to Phonetics by Means of Letter-To-Sound Rules*, NRL Report 7948, Naval Research Laboratory, Washington, D.C., Jan. 21, 1976.

Alternatively, or, in addition to the foregoing candidate pronunciation subsystems, generator 105 may comprise a statistically trained system to predict plausible pronunciations. Given a sizable training list of words together with known pronunciations (e.g., from a dictionary), a statistically trained system can learn the most likely mappings from letters in an orthography to phonemes in the corresponding pronunciation, in effect learning a set of letter to sound rules together with associated probabilities. In other words, these systems can generate candidate pronunciations for the word at hand from pronunciation patterns shared by words in the training list. Statistically trained subsystems for learning pronunciations from training lists are discussed in Tajchman, G., et al., *Building Multiple Pronunciation Models for Novel Words Using Exploratory Computational Phonology*, Eurospeech '95, Madrid, Spain, September 1995, and Daelemans, W., et al., *Language-Independent Data-Oriented Grapheme-to-Phoneme Conversion*, "Progress in Speech Synthesis", (Van Santen, et al. eds.), p. 77, Spring 1996, both of which are incorporated herein by reference.

Also, although a larger number of candidates will improve the odds that the "correct" pronunciation is available for selection, it will also increase the probability that a sub-optimal pronunciation is selected from the list. The number of candidates must therefore be limited in some way, or the speech recognizer 100 will have difficulty selecting among many, and very similar, pronunciations. The number of candidates can be limited either by a simple counter (e.g., <50) or by a probability threshold (e.g., >60%). Ultimately, the trade-off between more candidates for increased coverage and fewer candidates for recognition accuracy can be decided through trial and error.

Some candidate pronunciations generated by candidate pronunciation generator for the word "Peabody" are:

| | |
|---|---|
| p&b&dE | |
| p&bOdE | |
| p&bodE | |
| . . . | |
| pEabOdE | |
| pEabodE | |
| pEb&dE | <<desired |
| pEbOE | |
| pEbOdI | |
| pEbodE | <<default |
| pEbodI | |
| pE # E # A # bE # O # dE # wI | |

These are transmitted to automatic dictionary update module 120 in step 210. The two pronunciations of interest have been indicated for the convenience of the reader. Module 120, of course, will not know the end-user's preference at this point. The last entry in the candidate list is the word "Peabody" spelled out letter-by-letter. This is important in the case of acronyms such as "AMA" for which each letter is spoken individually.

In step 215, module 120 prompts the end-user (e.g., via display 50 and/or speakers 70) to speak the word "Peabody" into microphone 60 using the desired pronunciation. Sound card 80 digitally records this pronunciation, and stores it as a speech file in memory 30. At the same time, in step 220, module 120 builds a recognition grammar from the list of candidate pronunciations. The recognition grammar will be used by speech recognition engine 100 to "recognize" the word recorded in the speech file. The grammar will specifically allow all the candidate pronunciations as valid ways of speaking the target word "Peabody." As such, the recognition grammar will begin with a written notation similar to the following: peabody=(p&b&dE|p&bOdE| . . . |pEb&dE|pEbodE| . . . ). This grammar indicates that the word "peabody" may be mapped to phonemes of any member listed in the recognition grammar, in this case with equal probability for each member.

In step 225, speech recognition engine 100 compares the recorded speech file with each member of the recognition grammar, and, as is well known in the art, determines the probability that the sounds recorded in the speech file match the individual phonemes of each member of the recognition grammar. Speech recognition engine 100 will then either report the member with the highest overall probability to module 120 or, if some minimum threshold is not met, report a failure (e.g., if the end-user had recorded "hello" rather than "Peabody"). As can be appreciated, recognition eliminates or greatly reduces the trial and error in finding a correct pronunciation from among the list of candidate pronunciations. Otherwise, the end-user might have to listen to tens or hundreds of candidate pronunciations.

Assuming that a member of the recognition grammar is selected, the speech recognition engine 100 will, in step 230, return the phoneme sequence of the selected member to module 120. In addition to the phoneme sequence, the recognition engine 100 also provides the duration of each phoneme, as spoken by the end-user. The phoneme sequence selected by speech recognition engine 100 is shown below. The duration of each phoneme is shown in square brackets, in milliseconds:

p[50]
E[140]
b[60]
&[30]
d[70]
E[180]

Alternatively, the speech recognition engine 100 will return the "N" most likely members of the recognition grammar, ordered by the probability that each member will match the recorded word. As indicated above, many speech recognition engines now support multiple, ranked answers, typically called "N-best", because the end-user specifies the "N-best" matches to be reported, where N is some arbitrary number such as 1, 5, etc. If the most likely match is not, in fact, the best pronunciation as judged by the end-user in step 250 (discussed in detail hereinafter), then perhaps the second or third closest match will be better.

The "2-best" results for the present example may be:
1. p[50]E[140]b[60]&[30]d[70]E[180] 85%
2. p[50]&[100]b[80]O[50]d[80]E[170] 5%

Even when the "correct" phoneme sequence has been selected by the speech recognition engine 100, the TTS engine 90 still may not speak the word back to the end-user correctly. Without stress markers to guide pronunciation, TTS engine 90 can mispronounce the word with unacceptable frequency. In the trivial case, words containing only one syllable are given a primary stress on their central vowel. In multi-syllabic words, the vowel stress must be predicted.

Accordingly, in step 235, a stress predictor 95 analyzes the recorded speech file, and, in particular, the acoustic parameters of the speech file, to predict stress. As discussed above, speech recognition engine 100 has already supplied a tentative phonetic transcription giving the identity of each vowel phoneme (the "Identity") and the time it begins and ends (the "Duration"). These are two of the most critical parameters used to predict whether the phoneme at hand is stressed or not. In addition, the energy of the speech signal within each vowel phoneme is another important parameter used to predict stress. Both the energy and the duration of the vowel phoneme are often normalized by total word length to improve prediction accuracy. See, e.g., G. S. Ying et al., *Lexical Stress Detection on Stress-Minimal Word Pairs*, Proceedings of the 4th Intn'l Conference on Spoken Language Processing, Vol. 3, 1996 (ranking the stress predictive power of various parameters, including energy and duration normalized in three slightly different ways). The pitch (i.e., voice frequency) may also be a useful parameter to predict stress for words spoken in isolation (as in the present application), but less so in longer phrases, sentences, or paragraphs due to the competing influence of phrase intonation.

Accordingly, stress predictor 95 analyzes the recorded speech file and, for each vowel phoneme in the phoneme sequence selected by speech recognizer 100, calculates one or more of the following: the "Energy" (the average root-mean-square energy of the speech signal within the phoneme); the "Normalized Energy" (the energy of the phoneme divided by the average vowel energy within the word); the "Normalized Duration" (the phoneme duration divided by the word duration); the "Fundamental Frequency (FO)" (the average voice frequency within the phoneme, in Hertz); and the "Normalized FO" (the FO divided by average FO of other vowels within the same word).

The method used to predict stress from the parameters calculated for each phoneme, however, is not critical to the present invention. For example, as is well-known in the art, stress predictions can be generated from similar parameters by Bayesian classifiers, neural networks, hidden Markov models, etc. See, e.g., K. Jenkin and M. Scordilis, *Development and Comparison of Three Syllable Stress Classifiers*, Proceedings of the 4th Intn'l Conference on Spoken Language Processing, Vol. 2, 1996 (discussing the use of neural networks, hidden Markov models, and rule-based classifiers to predict syllable stress). The exemplary method discussed herein, however, focuses on the use of a classification and regression tree (CART), or, in other words, a statistically generated decision tree, which is a component of stress predictor 95.

To construct a CART to predict stress, training data is generated using known words and their associated speech files. For purposes of the present invention, the speech files are preferably words spoken in isolation or with minimal context, as opposed to long phrases or full sentences. Each word is then divided into its phonemes and the stress for each phoneme is obtained from the phonetic dictionary entry for the word. In addition, for each phoneme, the above-discussed parameters (e.g., energy, normalized energy, etc.) are calculated. Each phoneme is then stored together with its stress and calculated parameters. The set of phonemes and their corresponding stress and calculated parameters comprises the training data used to construct a CART to predict stress.

The CART can be deduced from the training data using commercially available algorithms, such as the CART building program known as "Wagon", which is publicly available from the University of Edinburgh, Centre for Speech Technology Research, Speech Tools Library (public domain), http://www.cstr.ed.ac.uk/projects/ speechtools.html, and which is incorporated herein by reference. Once the CART has been constructed, the decision whether a given phoneme of the speech file recorded by the end-user is stressed or unstressed then becomes a game of "20 (or more) questions" based on the parameters calculated by stress predictor 95 for that phoneme, as shown below:

Does Identity indicate the phoneme is a vowel?
If no, then the phoneme is unstressed.
If yes, is Normalized Energy greater than 1.5?
    If no, then<follow a chain of questions to a stress/unstressed decision>.
    If yes, then<follow a different chain of questions to a stress/unstressed decision>.

Regardless of the particular method used to predict stress, the final result is the addition of stress markers in step 240 to the raw phonetic transcription(s) that best matched the recorded speech file. Assume that the following is the proposed candidate with the predicted stress markers now added:

p"Eb&d.E

In steps 245 and 250, the TTS engine 90 reads this transcription to the end-user for confirmation. If all has gone well, the end-user will indicated acceptance of the transcription, and the word, with its transcription, in step 255, will be entered into dictionary 110 (and/or some other dictionary) so that future occurrences of that word for either TTS output or recognition input will rely on this "corrected" pronunciation.

The end-user is also allowed to associate one or more "part of speech" tags with the new pronunciation. The new pronunciation for "Peabody" will likely be useful only when "Peabody" is used as a proper noun. Since Peabody is unlikely to be used as anything other than a proper noun, the part of speech tag could be "ANY". The word "begin", however, can also be the name of a former Primer Minister of Israel when used as a proper noun, so the distinctions can be important.

If the end-user is not satisfied with the resulting playback, the present invention allows the end-user to continue with minimal effort on his part. Simplicity here is at least as important as the initial accuracy of the recognition and stress prediction. Some continuation strategies are as follows: (1) repeat confirmation using the second-best (third-best . . . ) candidate (as judged by the speech recognition engine 100 based on the recorded speech file); (2) ask the end-user to record another example of the target word, and then re-run the recognition and stress steps of FIG. 2; or (3) if the end-user judges that the phonemes are nearly correct but that the stress is wrong, allow the end-user to graphically correct the stress, e.g., by changing a "box" on display 50 containing a phoneme to indicate greater emphasis (e.g., the end-user can use the mouse 40 to make the box taller, wider, brighter, etc.).

Alternatively, after some number of rejected candidates, the system could ask the end-user to rank-order the rejected versions. The best of these, in other words, the nearest misses, would be used to reduce the initial list of candidate pronunciations. Candidates which are very different from any near-misses would be removed and then the process would be re-run beginning with recognition using the new, smaller, grammar.

Another possible continuation strategy is to allow the end-user to accept portions from multiple near-misses to manually assemble an acceptable pronunciation. This could be done graphically, e.g., by highlighting the first half of one transcription and the second half of another.

It is also possible for the system to track its own performance, i.e., the frequency with which the desired pronunciation is not available from among the candidates, and adjust the system performance over time. It could, for example, use more or fewer candidate pronunciations depending on recognition accuracy versus coverage of correct pronunciations.

The many features and advantages of the present invention are apparent from the detailed specification, and thus, it is intended by the appended claims to cover all such features and advantages of the invention which fall within the true spirit and scope of the present invention.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims.

I claim:

1. A method of allowing an end-user of a text-to-speech system or a speech recognition system to verbally update a phonetic dictionary, comprising the steps of:

recording a verbal pronunciation of at least one word, as spoken by the user;

generating a phonetic transcription of the at least one word based on the verbal pronunciation;

augmenting the phonetic transcription with syllable stress markers based on the verbal pronunciation; and entering the phonetic transcription into the dictionary.

2. The method of claim 1, wherein the verbal pronunciation is digitally recorded.

3. The method of claim 1, further comprising the steps of:

receiving an orthography of the at least one word;

generating candidate pronunciations;

generating a recognition grammar for the at least one word from the candidate pronunciations; and comparing the verbal pronunciation against the recognition grammar to generate the phonetic transcription.

4. The method of claim 1, further comprising the step of:

permitting the individual to associate a part of speech tag with the phonetic transcription.

5. The method of claim 1, wherein the step of augmenting the transcription with syllable stress markers is based on acoustical features of a phoneme of the verbal pronunciation of the at least one word.

6. The method of claim 5, wherein the acoustical features are selected from the group consisting of the identity of the phoneme, the duration of the phoneme, the energy of the phoneme, the normalized energy of the phoneme, the normalized duration of the phoneme, the fundamental frequency of the phoneme, and the normalized fundamental frequency of the phoneme.

7. The method of claim 1, further comprising the steps of:

using the phonetic transcription to speak the at least one word back to the individual for validation; and receiving an acceptance or a rejection of the phonetic transcription from the individual.

8. An article of manufacture for allowing an end-user of a text-to-speech system or a speech recognition system to verbally update a phonetic dictionary, comprising:

a computer readable medium having computer readable program code stored therein, the computer readable code for causing a computer system to receive a speech signal corresponding to at least one word spoken by the end-user, convert the speech signal into a phonetic transcription of the at least one word augment the phonetic transcription with syllable stress markers based on the speech signal, and enter the phonetic transcription into the dictionary.

9. A method for a text-to-speech (TTS) system to update individual entries in a phonetic dictionary, comprising the steps of:

receiving an indication from an end-user that the TTS system has mispronounced at least one word;

after receiving said indication, recording a verbal pronunciation of the at least one word as spoken by the end-user;

determining a phonetic transcription that corresponds to the at least one word as spoken by the end-user; and storing the phonetic transcription in the dictionary.

10. The method of claim 9, wherein the at least one word as spoken by the end-user is digitally recorded.

11. The method of claim 9, wherein the steps of determining a phonetic transcription includes the steps of:

receiving an orthography of the at least one word;

generating candidate pronunciations;

generating a recognition grammar for the at least one word based on the candidate pronunciations; and selecting a member of the recognition grammar whose phonemes match sounds in the recording of the at least one word.

12. The method of claim 11, wherein the step of determining a phonetic transcription includes the step of augmenting the transcription with syllable stress markers.

13. The method of claim 9, further comprising the steps of:

using the phonetic transcription to speak the at least one word back to the end-user for validation; and receiving an acceptance or a rejection of the phonetic transcription from the end-user.

14. The method of claim 9, further comprising the step of:

using the phonetic transcription as a default transcription, when the at least one word is encountered by the TTS system in text.

15. A method for a speech recognition system to update individual entries in a phonetic dictionary, comprising the steps of:

receiving an indication from an end-user that a phonetic transcription of at least one word in the dictionary should be updated;

after receiving said indication, recording a verbal pronunciation of the at least one word as spoken by the end-user;

determining a phonetic transcription that corresponds to the at least one word as spoken by the end-user; and storing the phonetic transcription in the dictionary.

16. The method of claim 15, wherein the at least one word as spoken by the end-user is digitally recorded.

17. The method of claim 15, wherein the steps of determining a phonetic transcription includes the steps of:

generating candidate pronunciations;

generating a recognition grammar for the at least one word based on the candidate pronunciations; and selecting a member of the recognition grammar whose phonemes match sounds in the recording of the at least one word.

18. The method of claim 15, wherein the step of determining a phonetic transcription includes the step of augmenting the transcription with syllable stress markers.

19. The method of claim 15, further comprising the steps of:

using the phonetic transcription to speak the at least one word back to the end-user for validation; and receiving an acceptance or a rejection of the phonetic transcription from the end-user.

20. The method of claim 15, further comprising the step of:

using the phonetic transcription as a default transcription, when the at least one word is encountered by the speech recognition system in speech.

21. A system for allowing an end-user of a text-to-speech system or a speech recognition system to verbally update a phonetic dictionary, comprising:

a memory device storing the phonetic dictionary;

a processor in communication with said memory device, the processor configured to receive a recorded verbal pronunciation of at least one word, as spoken by the end-user, generate a phonetic transcription of the at least one word based on the verbal pronunciation, augment the phonetic transcription with syllable stress markers based on the verbal pronunciation, and enter the phonetic transcription into the dictionary.

22. The system of claim 21, wherein the processor is further configured to receive an orthography of the at least one word whose pronunciation is to be recorded.

23. The system of claim 21, wherein the processor is further configured to generate a recognition grammar for the at least one word and compare the recorded verbal pronunciation against the recognition grammar to generate the phonetic transcription.

24. The system of claim 21, wherein the processor is further configured to speak the at least one word back to the individual using the phonetic transcription, and receive an acceptance or a rejection of the phonetic transcription from the individual.

* * * * *